Figure 1:
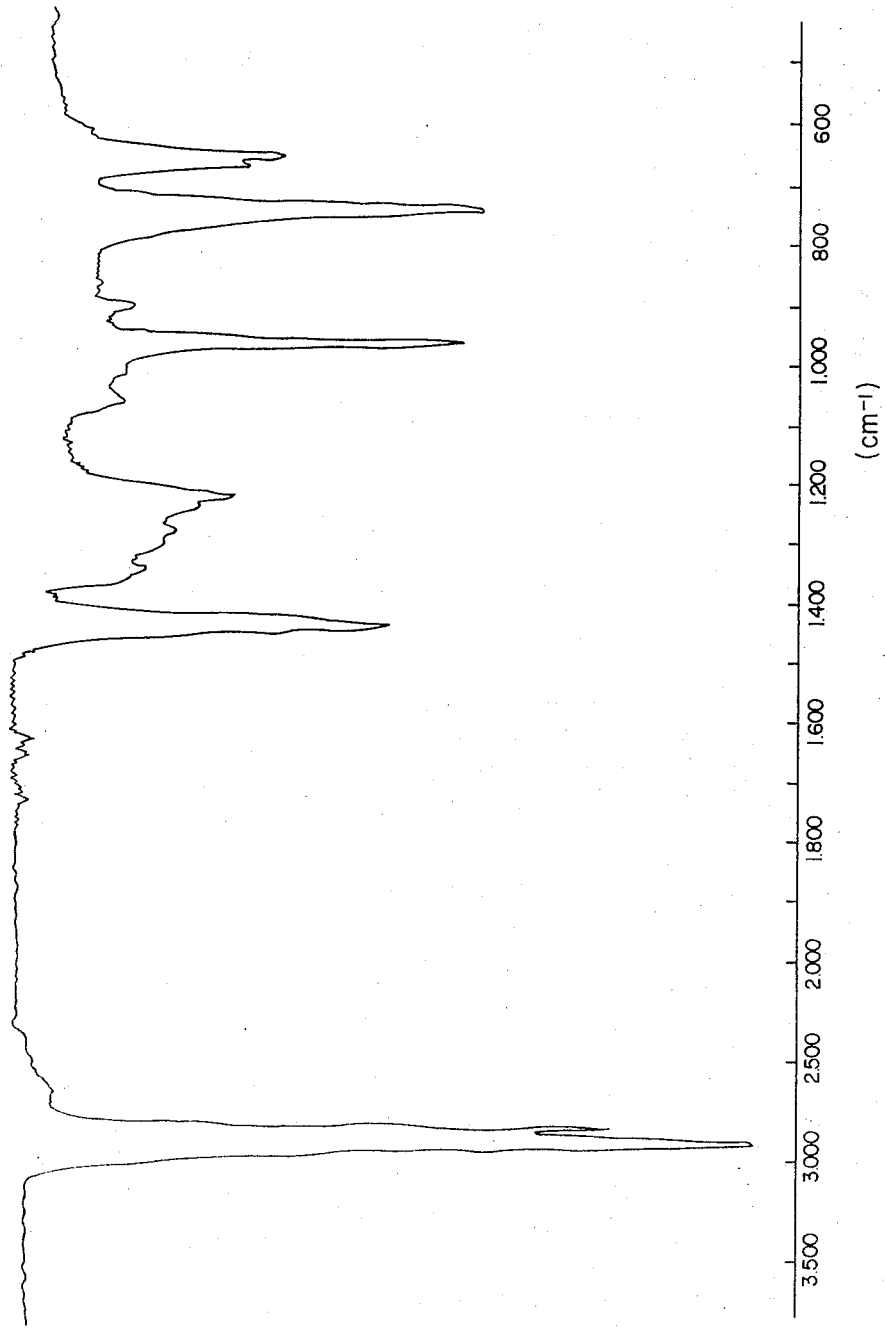

United States Patent
Ohashi et al.

[11] 3,846,388
[45] Nov. 5, 1974

[54] COPOLYMER OF A CONJUGATED DIOLEFIN AND VINYL CHLORIDE AND MANUFACTURING PROCESS THEREFOR

[75] Inventors: Takashi Ohashi; Ryozo Sakata, both of Tokyo, Japan

[73] Assignee: Bridgestone Tire Company Limited, Chuo-ku, Tokyo, Japan

[22] Filed: May 9, 1973

[21] Appl. No.: 358,807

Related U.S. Application Data

[63] Continuation of Ser. No. 122,445, March 9, 1971, abandoned.

[30] Foreign Application Priority Data

Oct. 7, 1970 Japan.............................. 45-87476
Mar. 10, 1970 Japan.............................. 45-19742

[52] U.S. Cl. .............................................. 260/82.1
[51] Int. Cl. ........................... C08d 3/04, C08d 1/18
[58] Field of Search ................................... 260/82.1

[56] References Cited
UNITED STATES PATENTS

| | | | |
|---|---|---|---|
| 2,560,492 | 7/1951 | Sparks .............................. | 260/82.1 |
| 3,029,231 | 4/1962 | Amerongen ....................... | 260/87.5 |
| 3,477,999 | 11/1969 | Takeda et al. ..................... | 260/78.5 |

Primary Examiner—Joseph L. Schofer
Assistant Examiner—William F. Hamrock
Attorney, Agent, or Firm—Zolu G. Schwartz

[57] ABSTRACT

A high molecular weight copolymer of a conjugated diolefin and vinyl chloride in which the vinyl chloride content is from 5 mol up to 50 mol percent relative to the total monomers and the vinyl chloride unit is distributed at random in the molecule chain, and a manufacturing process for such copolymer by carrying out the copolymerization by adding a particular catalyst in the presence of at least the vinyl chloride monomer, in a halogenated hydrocarbon as solvent, at a temperature of $-100°$ to $80°C$ so that the molar ratio of said catalyst to the total amount of the monomers as charged is 0.05 to 0.0001. The catalyst is any acidic Friedel-Crafts metal halide compound wherein the metal belongs to Group II to VIII of the Periodic Table or alkylaluminum halide compound of the general formula, $Al\ R_n\ X_{3-n}$ wherein R represents an alkyl group, X represents a halogen atom and $n$ represents 1 or 1.5.

11 Claims, 2 Drawing Figures

COPOLYMER OF A CONJUGATED DIOLEFIN AND VINYL CHLORIDE AND MANUFACTURING PROCESS THEREFOR

This application is a continuation application of Ser. No. 122,445, filed Mar. 9, 1971 now abandoned.

This invention relates to a copolymer of a conjugated diolefin and vinyl chloride and to a manufacturing process therefor, and more particularly to such copolymer whose vinyl chloride content is from 5 mol to 50 mol percent and in which the vinyl chloride units are randomly distributed in the molecular chain and such process for copolymerizing in solution using a cationic polymerization catalyst such as a Friedel-Crafts catalyst or a Lewis acid catalyst as initiator to be added in the presence of at least the vinyl chloride monomer.

Butadiene and vinyl chloride are relatively cheap so that they have been used as the raw material for various industrial products. The homopolymers thereof have respectively occupied important positions as synthetic rubbers and resins for various purposes. For the sake of internal plasticization, improvement in impact resistance and processability of the vinyl chloride polymer or in order to develop a new type of high molecular weight polymeric material, an attempt has hithertofore been made to prepare a copolymer of butadiene and vinyl chloride, only to find out that the copolymerization of these monomers is very difficult from various viewpoints. In fact reports of success are very few and in most of them free radical polymerization initiators are used.

For instance in U.S. Pat. No. 2,514,517 issued on Nov. 7, 1950 a process is disclosed for the emulsion copolymerization of said monomers using a free radical polymerization initiator under pressure. The ratios of the monomers charged are described in the specification but nothing on the vinyl chloride content of the resulting copolymer which is set forth as 10 to 40 percent merely in the Claims. According to the copolymerization reaction using any of the usual free radical polymerization initiators, the resulting products are apt to have little vinyl chloride content possibly due to the considerable difference in the relative reactivity of said two monomers. If the vinyl chloride monomer is charged in an amount intended to increase the relative content in the desired copolymer, the copolymerization activity is considerably lowered so that the intended copolymerization can not proceed to any substantial extent.

Japanese patent publication No. 3 937/1970 discloses a process for manufacturing a new resinous composition having a higher heat distortion-temperature by having the double bonds in molecules of polyvinyl chloride combined with a vulcanizer etc. so that 100 weight percent of vinyl chloride is copolymerized with as little as 0.03 weight percent of butadiene in the presence of a free radical polymerization initiator. However, nothing is disclosed, in this case as to the vinyl chloride content of the resulting copolymer. This specification refers to the fact that when a diolefin compound is charged in an amount sufficient to be copolymerized with vinyl chloride, then the reactivity of the vinyl chloride is retarded.

It is thus difficult to proceed with the copolymerization of butadiene and vinyl chloride using a free radical polymerization initiator, as the monomers would interfere with the reaction with each other. In fact butadiene can be used as a stabilizer for vinyl chloride monomer.

It is well known that a conjugated diolefin and vinyl chloride are respectively easily polymerized to obtain the respective homopolymer using a Ziegler catalyst consisting of a transition metal compound and an organometallic compound. When the conjugated diolefin and vinyl chloride are to be copolymerized using such Ziegler catalyst, however, the conjugated diolefin is generally strongly coordinated to the catalyst so as to prevent vinyl chloride from copolymerizing with the diolefin or so that the homopolymerization of the conjugated diolefin is selectively carried out or the polar groups of the vinyl chloride are reacted with the catalyst constituent to prevent the copolymerization.

Recently Yamazaki et al. has reportedly succeeded in copolymerizing butadiene and vinyl chloride using a catalyst system of dichlorodibutoxytitanium and diethylaluminum monochloride (vid. Yamazaki & Maeda, "Kogyo Kagaku Zasshi" which may be translated into "Journal of the Chemical Society of Japan Industrial Chemistry Section" 71, 1,549 (1,968)). According to their report the copolymerization was carried out by adding the catalyst in the presence of vinyl chloride monomer, firstly the titanium compound and then the aluminum compound, to be subjected to aging for 30 to 60 minutes at room temperature or at 30°C, followed by cooling and adding butadiene monomer thereto. The copolymer product was reportedly obtained in the form of a sticky substance having a low molecular weight in a very poor yield. It reported the copolymer as containing butadiene units of mainly trans-1,4 double bonds as shown by infrared absorption spectrum analysis but nothing on the amount of vinyl chloride content.

Japanese patent publication No. 15 740/1970 suggests not only the homopolymerization of vinyl chloride but also the copolymerization thereof with an olefin, above all which butadiene using a modified Ziegler catalyst, but actually discloses no example nor definite explanation on the copolymerization of butadiene with vinyl chloride.

It can thus be concluded that the copolymerization of a conjugated diolefin and vinyl chloride is very difficult and a manufacturing process for a solid copolymer of high molecular weight has not yet been proposed.

We, the inventors, have succeeded in producing such a copolymer in unexpectedly high yield by carrying out the copolymerization in the presence of a halogenated hydrocarbon as solvent by adding a catalyst, in the presence of at least the vinyl chloride monomer, selected from the group consisting of acidic Friedel-Crafts metal halide compounds wherein the metal is of Groups II to VIII of the Periodic Table and alkylaluminum halide compounds of the general formula, $Al\ R_n X_{3-n}$ wherein R represents an alkyl, X represents a halogen atom and $n$ represents 1 or 1.5.

According to the invention various copolymers whose form varies from colorless transparent elastomer to a white resinous powder can easily be obtained. It shall be explained in more detail hereinafter that the products are high molecular weight copolymers having a vinyl chloride content in the amount of 5 mol to 50 mol percent in which the conjugated diolefin units and vinyl chloride units are combined at random. It has been referred to above that such copolymers are novel and that such a manufacturing process was never anticipated nor obvious from the prior art.

It was public knowledge that various conjugated diolefin monomers including butadiene may be easily polymerized in the presence of a cationic polymerization catalyst such as a metal halide to produce the corresponding cyclic polymer of an extremely low degree of unsaturation, but there has been no information that vinyl chloride may be polymerized with use of such a catalyst. On the other hand vinyl chloride can be easily polymerized, using a free radical polymerization initiator. Although the polymerization of vinyl chloride using an alkyllithium catalyst has recently been reported (vid. V. Jisova, M. Kolinsky and D. Lim, J. Polymer Sci. Part A-1, 8, 1525–1533 (1,970)), it is not clear whether the polymerization occurred by an ionic mechanism.

Since it has been confirmed that even the homopolymerization of vinyl chloride could not be accomplished using any of the catalysts according to the invention, it was unexpectedly remarkable to have successfully copolymerized the conjugated diolefin with vinyl chloride so as to produce various copolymers having a varied vinyl chloride content and in the varied form from elastomer to resinous substance.

The copolymers obtained according to the invention have conjugated diolefin units and vinyl chloride units statistically combined at random, the vinyl chloride content of which may be varied from 5 mol up to 50 mol percent depending on the polymerization conditions. The conjugated diolefin units in the resulting copolymer are mainly of the 1,4-structure often containing a little vinyl structure. In general a small amount of cyclic structure is also present. The vinyl chloride units are substantially statistically distributed throughout the copolymer so that there are few vinyl chloride units combined side by side. In general there is no structure caused by dehydrochlorination of the vinyl chloride unit.

The characteristic structure of the copolymer of the invention shall be explained in more detail with respect to the copolymer with butadiene. In every butadiene-vinyl chloride copolymer whether it be elastomeric or resinous, the butadiene part has a trans-1,4 double bond showing a strong absorption at 970 cm$^{-1}$ and a vinyl type double bond showing a slight absorption at 907 cm$^{-1}$. A relatively sharp absorption can be observed at 650 – 660 cm$^{-1}$ showing the presence of carbon-chlorine linkage. The absorption observed at 745 cm$^{-1}$ varies depending on the amount of vinyl chloride content in the copolymer, from which the absorption is considered to represent a methylene group adjacent to the carbon-chlorine linkage which appears in the boundary structure between the butadiene and vinyl chloride units. It seems to be substantially the same as the absorption observed in case of the random copolymer of vinyl chloride with ethylene.

According to the 100 Mc nuclear magnetic resonance absorption spectrum of said copolymer, the absorption of the methylene proton of the polybutadiene part at the allylic position is observed at 8.02τ and that of the methine proton at 4.70τ respectively. At 7.84τ and 4.42τ there are observed absorptions respectively of the methylene proton and the methine proton of the butadiene part at the allylic position which has been said to shift to the lower magnetic field side when copolymerized with vinyl chloride. From the fact that the absorption of the methylene proton of vinyl chloride is observed in the vicinity of 6.1τ which can be observed in polyvinyl chloride, it can be concluded that the copolymer consists of butadiene and vinyl chloride units and that the vinyl chloride units are distributed at random. Further, from the fact that there is observed a relatively wide absorption region around 8.7τ which shows the presence of a saturated methylene proton, the copolymer should contain a cyclic structure partly at the butadiene part.

In view of the infrared absorption spectrum of polybutadiene in the form of a powder which can be obtained by homopolymerizing butadiene monomer using the catalyst of the invention, it can be concluded that the butadiene unit of the copolymer has a majority of trans-1,4 type double bonds and a minority of vinyl type double bond. Since the absorption of saturated methylene is markedly observed, the copolymer can be considered as containing a cyclic structure.

On the other hand there is no evidence showing the homopolymerization of vinyl chloride. From this fact also it is concluded that the product of the invention is not a mixture of polybutadiene and polyvinyl chloride nor a graft copolymer of butadiene with vinyl chloride, but the copolymer in which both units are arranged in the same chain.

This can also be confirmed by means of the following method. The resulting copolymer was subjected to fractional precipitation treatment using a tetrahydrofuran/water system which is usually used for polyvinyl chloride and a benzene/methanol system which is usually used for polybutadiene. Since the copolymer is soluble in tetrahydrofuran and also in benzene, 100 ml of 1 weight percent solutions were respectively prepared and water was added successively to the tetrahydrofuran solution and methanol to the benzene solution. When precipitated, the respective precipitates were separated. The poor solvents were respectively added successively to separate the respective precipitates which were then purified and dried. The analysis of the separated copolymer showed the following results from which the vinyl chloride contents may be varied more or less depending on the molecular weight but are not much different, which can establish the fact that a product is not the mixture of the homopolymers but the true copolymer having vinyl chloride units distributed at random.

| Fraction | Tetrahydrofuran/Water System | | Benzene/Methanol System | |
|---|---|---|---|---|
| | Weight (%) | Vinyl Chloride Content (Mol%) | Weight (%) | Vinyl Chloride Content (Mol%) |
| 1 | 65 | 28.36 | 72 | 27.03 |
| 2 | 25 | 30.55 | 7 | 28.11 |
| 3 | 7 | 30.80 | 14 | 33.00 |

The monomers to be copolymerized according to the invention are conjugated diolefins having 4 – 10 carbon atoms on the one hand and vinyl chloride on the other hand. As for the conjugated diolefins, butadiene, isoprene, pentadiene, dimethylbutadiene, phenylbutadiene and the like may be used, but butadiene and isoprene are preferably used, and butadiene is particularly desirable. The ratio of the conjugated diolefin with vinyl chloride to be copolymerized can be varied within a fairly wide range. When the conjugated diolefin is used in relatively large amounts compared to the vinyl chloride, then the reaction rate may be high but the vinyl chloride content in the resulting copolymer is less and often gelation occurs. On the contrary if vinyl chloride is used in a large amount relative to the conjugated diolefin, the polymerization activity may be rather low but a copolymer of high vinyl chloride content can be obtained. In general the ratio of the conjugated diolefin to vinyl chloride as charged is varied from 98/2 to 2/98, but preferably from 95/5 to 5/95, and more preferably from 90/10 to 10/90.

The catalyst to be used in the invention is any of the acidic metal halides whose metal belongs to Groups II to VIII of the Periodic Table, in other words a Friedel-Crafts catalyst or any of the organo aluminum halides which falls in the category of Lewis acids. Among the acidic Friedel-Crafts metal halides are halides of aluminum, beryllium, cadmium, zinc, boron, gallium, titanium, zirconium, tin, antimony, bismuth, iron, uranium, rhenium, vanadium, tungsten, molybdenum, and the like of which aluminum, boron, gallium, titanium, tin, iron, vanadium and tungsten are more preferably used. Specific examples are aluminum trichloride, aluminum tribromide, beryllium dichloride, cadmium dichloride, zinc dichloride, boron trifluoride, boron trichloride, boron tribromide, gallium trichloride, gallium tribromide, titanium tetrachloride, titanium tetrabromide, zirconium tetrachloride, stannic chloride, stannic bromide, antimony trichloride, antimony pentachloride, bismuth trichloride, ferric chloride, uranium tetrachloride, rhenium pentachloride, vanadium tetrachloride, vanadyl trichloride, tungsten hexachloride, molybdenum pentachloride, among which those compounds soluble in halogenated hydrocarbons, aliphatic hydrocarbons, aliphatic or aromatic nitro compounds, and above all those compounds which are liquid themselves at room temperature are more preferable. The compounds which are in the gaseous state at room temperature such as boron trifluoride are used preferably for instance in the form of a complex such as boron trifluoride etherate. Thus typical Friedel-Crafts catalysts such as aluminum trichloride, aluminum tribromide, boron trifluoride etherate, gallium trichloride, titanium tetrachloride, stannic tetrachloride, ferric chloride, vanadyl trichloride and vanadium tetrachloride are desirable for attaining good results.

The organic aluminum halides to be used as a catalyst are represented by the formula, $AlR_nX_{3-n}$ wherein R is an alkyl group having 1 to 4 carbon atoms, X is a halogen atom such as chlorine, bromine, iodine and fluorine, n is 1 or 1.5, among which are methylaluminum dichloride, methylaluminum sesquichloride, ethylaluminum dichloride, ethylaluminum dibromide, ethylaluminum sesquichloride, N-propylaluminum dichloride, n-propylaluminum sesquichloride, i-propylaluminum dichloride, i-propylaluminum sesquichloride, n-butylaluminum dichloride, n-butylaluminum dibromide, n-butylaluminum sesquichloride, n-butylaluminum sesquibromide, i-butylaluminum dichloride, i-butylaluminum sesquichloride t-butylaluminum dichloride and t-butylaluminum sesquichloride. Above all alkyl aluminum chlorides such as ethylaluminum dichloride and butylaluminum dichloride are preferable.

As the organo aluminum halides, the reaction mixtures of compounds obtained from an aluminum halide and an alkylaluminum compound may be used as they are. In this case it is possible to control the ratio of the reactants in order to use the resulting product as it is although it can not be considered as the pure organoaluminum halide.

The amount of the catalyst to be used in invention, whether it is an acidic Friedel-Crafts metal halide or an organoaluminum halide, is generally 0.05 mol to 0.001 mol in relation to 1 mol of the total monomers to be copolymerized, and preferably ranges from 0.005 mol to 0.0002 mol.

Any one of said compounds can be used as a catalyst, but it is also possible to use two or more of them in combination.

The copolymerization according to the invention is carried out in a solvent, an aromatic or aliphatic halogenated hydrocarbon; such as carbon tetrachloride, chloroform, methylene chloride, tetrachloroethane, trichloroethane, 1,2-dichloroethane, tetrachloroethylene, trichloroethylene, 1,2-dichloroethylene, amyl chloride, monochlorobenzene, dichlorobenzene and monobromobenzene. In case of solvents having a higher freezing point and when the copolymerization temperature is low, the reaction can not be carried out in the liquid state. Thus, for that purpose, solvents having a relatively lower freezing point such as chloroform and above all methylene chloride are preferably used.

It is important in order to obtain a copolymer having a high vinyl chloride content in higher effectiveness to add the catalyst in the presence of at least the vinyl chloride monomer. When the catalyst is added in the absence of the vinyl chloride monomer which is fed thereafter, homopolymerization of butadiene would dominantly occur so as to produce a copolymer of extremely low vinyl chloride content which might be considered substantially a homopolymer of the conjugated diolefin. As long as the catalyst is added in the presence of vinyl chloride, the order for adding the conjugated diolefin monomer and the solvent does not matter. Even if either of them is added first or both are added concurrently, a desirable uncolored vinyl chloride-diolefin copolymer can be obtained with a sufficient content of vinyl chloride.

As for the copolymerization temperature, generally the range of −100° to 80°C may be taken into consideration, but in order to avoid eventual coloration caused by dehydrochlorination, and gelation which forms an insoluble and in fusible mass and in order to obtain useful conjugated diolefin-vinyl chloride copolymers in forms varying from soluble, colorless and transparent elastomers to white resinous powders, the range of −100° to 20° is preferable. Since the gelation tendency is higher when the ratio of the conjugated diolefin monomer charged is relatively higher and at a higher copolymerization temperature, it is desirable to carry out the reaction at a temperature as low as possible as long as the polymerization activity is not noticeably decreased. From this view point the temperature of −100° to 0°C would be most preferable. The copolymerization is preferably carried out under a pressure determined by the vapor pressure in the reaction system to 50 atm. and in an inert atmosphere such as nitrogen.

The resulting copolymer according to the invention can be easily separated from the reactant system by means of the usual methods such as addition of a precipitant, steam stripping etc. In the case where the copolymerization is carried out in a diluent which can not dissolve the resulting copolymer, the precipitated product can be taken out directly from the reaction system. The copolymer separated from the system can be used after being subjected to purifying treatments such as removal of catalyst residue etc. or directly as it is merely after removing the volatile substances. It is preferable to add, to the product copolymer, a stabilizer, antioxidant etc. of the type usually used for the preparation of synthetic rubbers or of a stabilizer generally used for the manufacture of polyvinyl chloride, to prevent the copolymer from being deteriorated due to gelation and the like caused during storage thereof.

Taking into consideration the matters referred to above, the copolymers of the conjugated diolefin and vinyl chloride in a form which varies from elastomer to resinous substance can be obtained easily and in high effectiveness despite the fact that it has been considered very difficult. It is noted that the raw materials of the invention are such monomers as having been widely used for manufacturing the usual synthetic rubbers and the vinyl chloride monomer usually used for manufacturing the popular synthetic resin, polyvinyl chloride. The new copolymers are very useful in view of having desirable properties as elastomer and synthetic resin for various industrial fields.

The process of the invention shall be explained in more detail with respect to examples which are given merely for the purpose of explanation but not for limiting the invention thereto.

EXAMPLE 1

A pressure-proof glass test tube of 80 ml capacity flushed with dried nitrogen gas was connected to a vacuum source and cooled sufficiently in a dry ice-methanol bath. Into said tube was charged 140 m mol (8.0 ml) of previously liquified vinyl chloride by means of the distillation method and 40 ml of methylene chloride was added as solvent. After shaking, 60 m mol (4.6 ml) liquefied butadiene was added thereto, which mixture was again subjected to shaking. Under a flow of nitrogen gas 1.0 ml n-hexane solution of ethylaluminium dichloride (1 mol/l concentration) was added from a hypodermic syringe with shaking. After completion of the catalyst addition, the reaction system was light amber in color. The tube was sealed at the open end in vacuo and left in a dry ice-methanol bath at −78°C for 24 hours to allow the copolymerization to proceed. No substantial change in the appearance of the reaction system was observed after said 24 hours except a little increase in viscosity of the solution and slight coloration. Namely the completely homogeneous solution polymerization was carried out without any evidence of a precipitate. The tube was opened and the contents poured into a large amount of methanol containing a small amount of hydrochloric acid and an antioxidant so that a white powder was precipitated, and was allowed to stand overnight. After that the liquid phase colored by the catalyst residue and the like was filtered off. The precipitate was washed a few times with methanol containing a small amount of the antioxidant dried at room temperature in vacuo for 48 hours to obtain a pure white fine powder in the amount of 2.59 gr. The yield of the copolymer was 21.6 percent by weight relative to the total weight of the monomers.

The copolymer was soluble in solvents such as benzene, toluene, xylene, tetrahydrofuran, cyclohexanone, ethyl acetate, carbon disulfide, pyridine, carbon tetrachloride, chloroform, methylene chloride and dichloroethane, and insoluble in acetone, methyl ethyl ketone, ethyl ether, n-hexane and dimethyl formamide. A carbon disulfide solution of the copolymer was poured over a potassium bromide crystal plate to completely remove carbon disulfide to form a thin film. From the infrared absorption spectrum of said film, there was observed an absorption at 1,635 cm$^{-1}$ showing the presence of carbon-carbon double bonds, a strong absorption showing the presence of trans-1,4 double bonds at 965 cm$^{-1}$ and an absorption at 907 cm$^{-1}$ showing the presence of vinyl type double bonds, as seen in FIG. 1. An absorption showing the presence of the carbonchlorine linkage of the vinyl chloride unit was observed at 655 – 670 cm$^{-1}$ as shifted to the higher wave number side from the absorption region which can be observed in the case of polyvinyl chloride. A relatively large absorption could be observed at 745 cm$^{-1}$ which illustrates the presence of the methylene chain,

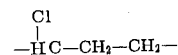

having carbon-chlorine linkage caused from combining a vinyl chloride unit with a butadiene unit. This is supported by the fact that the same absorption can be seen in the same region in the case of an ethylenevinyl chloride copolymer and chlorinated polybutadiene. The intensity of the absorption is increased or decreased depending on the chlorine content in the copolymer from which it is considered as showing the presence of the boundary structure between a butadiene unit and a vinyl chloride unit. Even from the results of the infrared absorption spectrum alone, it can be concluded that the product is copolymerized considerably at random.

Figure 2:
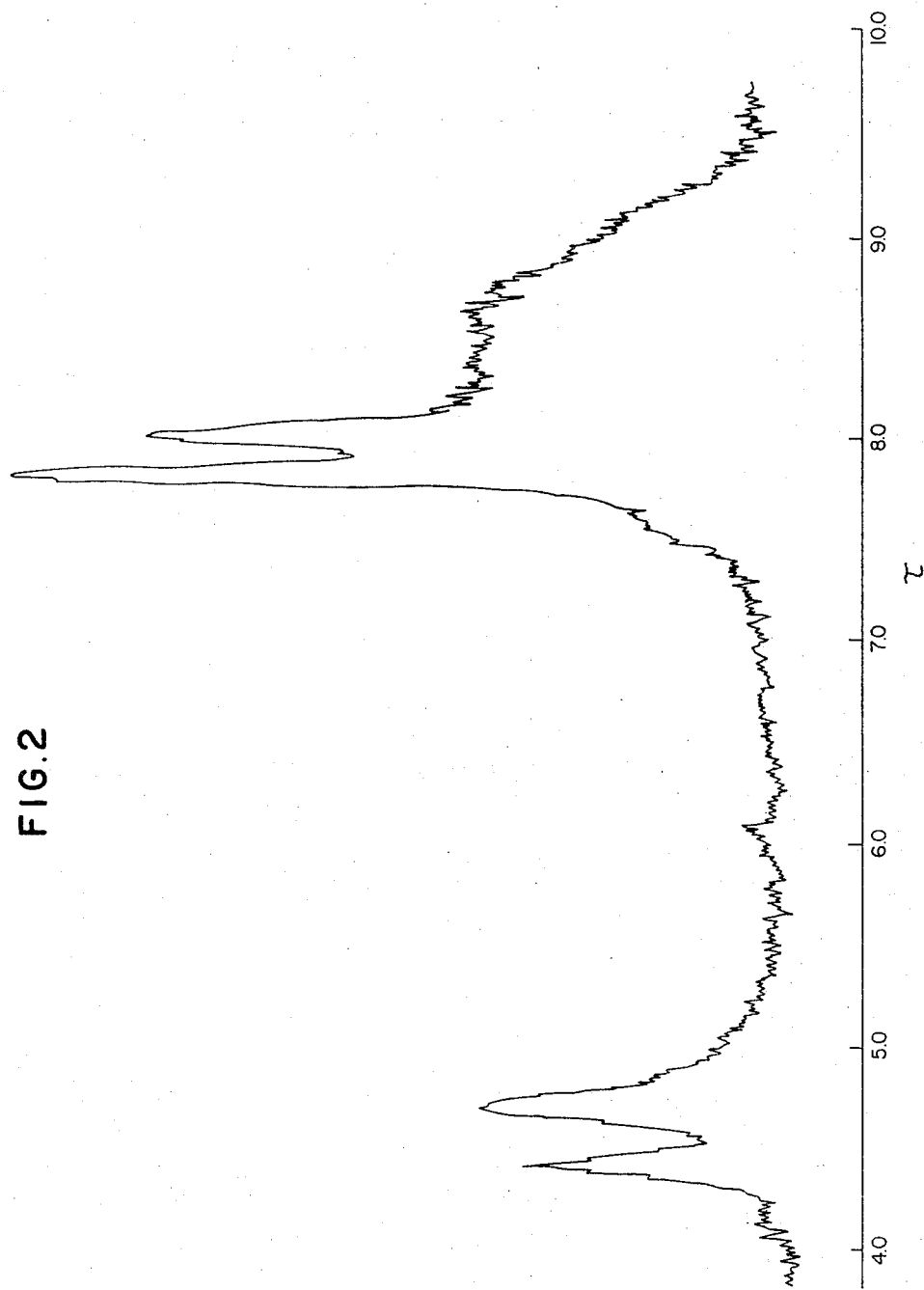

A 15 weight carbon disulfide solution of the copolymer was prepared for subjecting 100 Mc nuclear magnetic resonance absorption spectrum at room temperature and using tetramethylsilane as an internal standard and the results are shown in FIG. 2. There was clearly observed an absorption of the methylene proton of the allylic position caused by the butadiene-butadiene chain at 8.02 $\tau$ and similarly of the methylene proton at 4.70 $\tau$. At 7.84 $\tau$ and 4.42 $\tau$ respectively there were observed absorptions of the methylene proton of the butadiene unit at the allylic position and similarly of the methylene proton which are said to be shifted to the lower magnetic field side when copolymerized with vinyl chloride. In the vicinity of 6.1 $\tau$ there was observed only a slight absorption of the methylene proton caused by the vinyl chloride — vinyl chloride chain which can be clearly observed in the case of polyvinyl chloride, from which the product is concluded to be a copolymer with butadiene having vinyl chloride units distributed at random. From the fact that there was observed a wide absorption region showing the presence of the saturated methylene proton in the vicinity of 8.7 $\tau$, the copolymer is considered to comprise a cyclic structure partly at the butadiene part. In view also of the solubility of the copolymer, the product is considered not to be a mixture of polybutadiene and polyvinyl chloride but the true copolymer. According to quantitative analysis by means of the Schoniger-flask burning method, the chlorine content was 23.30 weight, which value correctly coincides with the balance of 100.00 percent minus the total of carbon and hydrogen contents as determined by quantitative analysis, so as to establish no occurence of a dehydrochlorination reaction. The vinyl chloride content in the copolymer as calculated from said chlorine content was 38 mol percent. The viscosity of the copolymer was determined on a solution of 0.3 gr. copolymer in 30 ml toluene using Ubbelohde's viscometer at a temperature of 30°C. The reduced viscosity value was $\eta sp/c = 0.083$.

REFERENCE EXAMPLE 1

The copolymerization was carried out similarly to Example 1 except that 40 ml n-hexane was used in lieu of methylene chloride. The reaction system was heterogeneous and when the reaction was completed the copolymer was precipitated in the form of a flock. Using to the similar isolation steps a powder with gelation was obtained only in the amount of 0.14 gr. (1.2 percent yield). As a result of the Schönigerflask burning method, the chlorine content was 14.23 weight percent. The vinyl chloride content in the copolymer was 23 mol percent. The copolymerization was carried out using tetrahydrofuran in lieu of n-hexane, but the reaction did not occur at all and no copolymer was obtained.

EXAMPLE 2

The copolymerization was carried out similarly to Example 1 except that isoprene was used in lieu of butadiene. Namely a pressure-proof glass test tube of 50 ml capacity was treated similarly and charged with 70 m mol (4.0 ml) liquified vinyl chloride, 30 ml methylene chloride and 30 m mol (3.0 ml) isoprene at −78°C with shaking. After adding 0.5 ml of a solution of ethylaluminum dichloride in n-hexane (1 mol/1 concentration) thereto with shaking, the tube was allowed to stand in the dry ice/methanol bath at −78°C for 1.5 hours to carry out the copolymerization. After the copolymerization was completed, a white powdery product was obtained in the amount of 1.06 gr. (16.5 weight percent yield) using the same isolation steps as in Example 1. The quantitative analysis by the Schönigerflask burning method showed a chlorine content of 3.83 weight percent and a vinyl chloride content of 7 mol percent. According to the viscosity determination of the product copolymer similar to Example 1, the reduced viscosity of $\eta sp/c = 0.30$ was obtained.

EXAMPLES 3 – 5; REFERENCE EXAMPLES 2 AND 3

The copolymerizations of butadiene and vinyl chloride were carried out according to the same process as disclosed in Example 1 varying the molar ratio between the monomers, and the polymerization time, in which the catalyst was commonly used in the form of a n-hexane solution of ethylaluminum dichloride (1.0 mol/l concentration) in the amount of 0.2 mol percent relative to the total monomers charged and methylene chloride as reaction solvent was used in each case in the amount of 30 ml, the results being given in Table 1.

Table 1

| Example | Charge Amount | | Reaction Conditions (°C) × (hour) | Product Yield(w%) | Vin.Chl. Content (mol %)* | Reduced Visc. ($\eta sp/c$)** |
|---|---|---|---|---|---|---|
| | But. (m mol) | Vin.Chl (m mol) | | | | |
| (Ref.2) | 0 | 100 | −78 × 15.0 | 0 | — | — |
| 3 | 30 | 70 | −78 × 1.5 | 8.3 | 30 | 0.090 |
| 4 | 50 | 50 | −78 × 1.5 | 20.1 | 21 | 0.123 |
| 5 | 70 | 30 | −78 × 0.8 | 38.8 | 9 | 0.180 |
| (Ref.3) | 100 | 0 | −78 × 1.5 | 16.1 | 0 | 0.386 |

\* Calculated from the chlorine analysis result according to the Schoniger-flask burning method

EXAMPLES 6 – 8

The copolymerization of butadiene and vinyl chloride was carried out using various halogenated hydrocarbons in lieu of methylene chloride in Example 1. The isolation steps etc. were just the same as in said Example. The results are shown in Table 2.

Table 2

| Example | Hydrocarbon Halide | Conditions (°C) × (hour) | Product Yield (weight %) | Vin. Chl. Content (mol %)* |
|---|---|---|---|---|
| 6 | Carbon Tetrachloride | −45 × 20.0 | 2.8 | 18 |
| 7 | Chloroform | −78 × 24.0 | 4.2 | 25 |
| 8 | 1,2-dichloroethane | −45 × 6.0 | 18.7 | 21 |

\* Calculated from the chlorine analysis result according to the Schoniger-flask burning method

EXAMPLE 9

After mixing 50 m mol (3.8 ml) liquified butadiene, 50 m mol (2.8 ml) liquified vinyl chloride and 20 ml methylene chloride as a solvent in the same device as in Example 1 using a dry ice-methanol bath at −78°C, 5 ml of a n-hexane solution of aluminum tribromide (0.1 mol/l concentration) was added thereto as catalyst with shaking to mix sufficiently. The test tube, after being sealed, was placed in the dry ice-methanol bath and allowed to stand undisturbed to carry out the copolymerization for 2 hours. The product was obtained in the form of a white powder in 9.0 percent yield, in which the chlorine content was 13.14 weight. The vinyl chloride content in the copolymer was 21 mol percent.

EXAMPLE 10

The copolymerization and the isolation steps carried out as in Example 8 except that the monomers charged were 30 m mol (2.3 ml) butadiene and 70 m mol (4.0 ml) vinyl chloride and 3.0 ml of a n-hexane solution of aluminum tribromide (0.1 mol/l concentration) and 30 ml of methylene chloride, were added for the polymerization reaction of 24 hours, to obtain a fine white powder in the amount of 0.49 gr. (8.2 weight percent yield). The similar determination of chlorine content showed 16.68 weight percent. The copolymer whose vinyl chloride content was 27 mol percent was soluble in benzene, toluene, tetrahydrofuran and carbon disulfide.

EXAMPLE 11

The reactants were charged as in Example 9 except that 5 ml methylene chloride was used as solvent and 3.0 ml of a nitromethane solution of aluminum trichloride (0.1 mol/l concentration) in lieu of aluminum tribromide was used as catalyst, in the test tube which was, after being sealed, left in the bath at 0°C to stand for a 24 hour copolymerization. After the usual aftertreatments, a light yellow elastomer was obtained in the amount of 0.51 gr. (8.7 weight percent yield), in which chlorine the content was 7.88 weight percent. The vinyl chloride content in the copolymer was 12 mol percent.

EXAMPLE 12

The copolymerization was carried out as in Example 1 except that 1.0 ml n-hexane solution of a reaction product previously obtained by mixing 1 mol triethylaluminum and 2 mol aluminum trichloride (1.0 mol/l concentration) was used as catalyst, to obtain 2.80 gr. of a pure white fine powder (23.3 weight percent yield), whose chlorine content was 18.61 weight according to the Schöniger-flask burning method. The vinyl chloride content in the copolymer was 30 mol percent. A solution of 0.3 gr. of the resulting copolymer in 30 ml toluene was used to determine the reduced viscosity at 30°C to obtain $\eta sp.c=0.119$. The average molecular weight determined by means of the V.P.O. method in benzene solution was about 3,500. The resulting copolymer in the amount of 100 m gr. was subjected to thermal gravimetric analysis respectively in air and nitrogen atmospheres using the thermobalance by Santon Company. It was found that the weight decrease rates were small and no sudden weight decrease due to zipper type dehydrochlorination reaction as in the of polyvinyl chloride could be observed, from which it was established that the vinyl chloride units were copolymerized at random.

EXAMPLE 13

The copolymerization was carried out as in Example 1 with charging 30 m mol (2.3 ml) liquified butadiene and 70 m mol (4.0 ml) vinyl chloride and using 30 ml of a methylene chloride as solvent and 0.5 ml n-hexane solution of ethylaluminum sesquichloride (1.0 mol/l concentration) as catalyst. The reaction system was homogeneous, colorless and transparent. After isolation as in Example 1, a pure white fine powder was obtained in the amount of 0.64 gr. (10.7 weight percent yield), whose chlorine content was 16.60 weight. The vinyl chloride content in the copolymer was 26 mol percent.

REFERENCE EXAMPLE 4

The copolymerization was attempted as in Example 1 but using diethylaluminum monochloride or triethyl aluminum in lieu of ethylaluminum dichloride as catalyst. No copolymer was obtained.

EXAMPLE 14

A pressure-proof glass test tube having a capacity of 50 ml flushed with dried nitrogen gas and charged, in vacuo and at −78°C, with 50 m mol (3.8 ml) liquified butadiene, 50 m mol (2.8 ml) liquified vinyl chloride and 20 ml methylene chloride thereinto in that order, followed by shaking to mix the reactants sufficiently. After adding 1.0 ml of a n-hexane solution of titanium tetrachloride (0.5 mol/l concentration) thereto, the tube was again shaken, sealed and placed in a dry ice methanol bath of at −78°C to allow the copolymerization to proceed for 26 hours. The reaction system was homogeneous from the beginning to the end and was a transparent light yellow. After the completion of the reaction, the product was poured into a large amount of methanol containing a small amount of hydrochloric acid and an antioxidant, to precipitate a white elastomeric substance. After subjecting the same to washing with methanol containing an antioxidant and drying in vacuo at room temperature for 48 hours a transparent light grey elastomeric substance was obtained in the amount of 0.33 gr. (5.6 weight percent yield). This elastomeric copolymer was found to contain 14.24 weight chlorine according to the Schöniger-flask burning method and 22 mol percent vinyl chloride content. The copolymer was soluble in benzene, toluene, xylene, tetrahydrofuran, carbon disulfide, carbon tetrachloride, chloroform, methylene chloride and 1,2-dichloroethane. It contained no gel. The infrared absorption spectrum of a film prepared by pouring a carbon disulfide solution thereof on a potassium bromide crystalline plate gave a chart substantially the same as that of the copolymer in the form of a powder, but different in that a peak was observed at 615 cm$^{-1}$ showing the presence of a carbon-chlorine linkage characteristic of atactic vinyl chloride-vinyl chloride sequence, and that the absorptions at 2,920 and 1,450 cm$^{-1}$ showing the presence of a saturated methylene chain were decreased relative to the absorption of the trans-1,4 double bond at 970 cm$^{-1}$ from which it is concluded that there is lesser cyclic structure. The copolymer in the amount of 15 weight percent was dissolved in carbon disulfide and subjected to 100 Mc nuclear magnetic resonance absorption spectrum determination at room temperature and using tetramethylsilane as an internal standard which gave substantially the same chart as in the case of the fine powder copolymer except that the wide peak in the vicinity of 8.7 showing the presence of saturated methylene protons was considerably smaller just as anticipated. From these results, it can be said that the resulting elastomeric product was a copolymer of butadiene and vinyl chloride having lesser cyclic structure. The viscosity of the copolymer was determined similarly to Example 1 to obtain a reduced viscosity of $\eta sp/c=0.115$.

EXAMPLES 15 AND 16; REFERENCE EXAMPLES 5 AND 6

The copolymerizations of butadiene and vinyl chloride were carried out as in Example 14 varying the molar ratio of the monomers as charged, catalyst concentration and polymerization time. A n-hexane solution of titanium tetrachloride (1.0 mol/l concentration) as catalyst was used in varying amounts in the range of 0.15 – 0.2 mol percent in relation to the total monomers as charged, and methylene chloride as solvent was used in each case in the amount of 20 ml. The results are given in Table 3.

Table 3

| Example | Charged Monomer Butadiene (m mol) | Charged Monomer in. Chl. (m mol) | Catalyst Concent. mol%/monomer | Polymerization Conditions (°C)×(hour) | Copolymer Yield (weight %) | Vin.Chl. Content (mol %) * | Reduced Visc. ηsp/c)** |
|---|---|---|---|---|---|---|---|
| (Ref. 5) | 0 | 100 | 0.2 | −78 × 60 | 0 | — | — |
| 15 | 50 | 50 | 0.15 | −78 × 20 | 5.1 | 21 | 0.135 |
| 16 | 70 | 30 | 0.2 | −78 × 24 | 9.3 | 12 | 0.193 |
| (Ref. 6) | 100 | 0 | 0.15 | −78 × 24 | 13.2 | 0 | 0.463 |

* Calculated from chlorine content determined by means of the Schonizer-flask burning method
** Determined as in Example 1 using a solution of 0.3 gr. copolymer in 30 ml toluene As seen from the above, the homopolymerization of vinyl chloride never occurred when the catalyst as referred to above was used. On the other hand the homopolymerization of butadiene was caused in the presence of said catalyst to obtain an elastomeric product. The copolymers of butadiene and vinyl chloride were elastomeric no matter what the ratio between the two monomers as charged was.

EXAMPLES 17 – 19

The copolymerizations of butadiene and vinyl chloride were carried out as in Example 1 using various acidic metal halide compounds known as Friedel-Crafts catalysts. As the monomers, 50 m mol (3.8 ml) butadiene and 50 m mol (2.8 ml) vinyl chloride were charged. The amount of methylene chloride as solvent was varied depending on the nature of the catalyst. The solution of stannic chloride in n-hexane (0.5 mol/l concentration), a solution of boron trifluoride etherate in methylene chloride (1.0 mol/l concentration) and a solution of ferric chloride in n-hexane (0.1 mol/l concentration) were used as catalyst respectively in the amount of 0.5 mol relative to the charged monomers. The reaction was to carried out in a bath controlled at 0°C for 24 hours. The results are shown in Table 4.

Table 4

| Example | Catalyst | Solvent (ml) | Copolymer Yield (weight %) | Vin.Chl. Content (mol%) * | Appearance |
|---|---|---|---|---|---|
| 17 | Stannic chloride | 5.0 | 5.3 | 15 | Elastomeric |
| 18 | Boron Trifluoride Etherate | 5.0 | 25.8 | 12 | White fine powder |
| 19 | Ferric-chloride | 10.0 | 23.1 | 14 | Elastomeric |

* Calculated from the chlorine content as determined by Schoniger-flask burning method

EXAMPLES 20 AND 21

The copolymerization of butadiene and vinyl chloride was carried out similarly to Example 19 but different in a catalyst which was the solution of ferric chloride in nitromethane (0.1 mol/l concentration) and in the ratio of the charged monomers, of which the results are given in Table 5.

Table 5

| Example | Charged Monomer Butadiene (m mol) | Charged Monomer Vin.Chl. (m mol) | Copolymer Yield (weight %) | Vin.Chl. Content (mol %) * | Appearance |
|---|---|---|---|---|---|
| 20 | 30 | 70 | 3.7 | 24 | Sticky Solid |
| 21 | 50 | 50 | 7.4 | 13 | do. |

* Calculated from the chlorine content as determined by the Schoniger-flask burning method As seen from the table, the copolymerization activity was lowered and the resulting copolymer molecular weight was low due to the presence of a small amount of the polar solvent in the reaction system.

EXAMPLES 22 – 24

The copolymerization of butadiene and vinyl chloride was carried out as in Example 14 but using a solution of vanadium tetrachloride in lieu of titanium tetrachloride as catalyst in n-hexane (1.0 mole/l) and varying the ratios between the two monomers as charged. Methylene chloride as reaction solvent was added in each case in the amount of 20 ml, and the catalyst concentration was 0.5 mol percent relative to the total monomers charged. The test tube flushed with dried nitrogen gas was cooled in a dry ice-methanol bath at −78°C, charged with the respective amount of monomers, and then diluted with the solvent. The reaction system was mixed well by shaking, followed by adding the catalyst solution thereto after which became dark brown. After the lapse of the respectively predetermined polymerization time, the isolation, analyses for of infrared absorption spectrum, nuclear magnetic resonance absorption spectrum and chlorine content were carried out as in Example 14, and the results are given in Table 6.

Table 6

| Example | Charged Monomer | | Polymerization Conditions (°C)×(hour) | Copolymer Yield (weight %) | Vin.Chl. Content (mol %) * | Appearance |
| --- | --- | --- | --- | --- | --- | --- |
| | Butadiene (mol) | Vin.Chl. (m mol) | | | | |
| 22 | 30 | 70 | −78 × 24 | 10.2 | 29 | White Pine Powder |
| 23 | 50 | 50 | −78 × 20 | 15.7 | 25 | do. |
| 24 | 70 | 30 | −78 × 15 | 28.2 | 17 | do. |

* Calculated from the chlorine content determined by means of the Schoniger-flask burning method As appreciated from the above, the polymerization activity varied considerably depending on the molar ratios between the monomers as charged. As the relative ratio of butadiene was increased the activity also was increased with accompanying correspondingly increased gelation, but by suitably changing the polymerization conditions the desirable copolymer was obtained.

EXAMPLE 25

The copolymerization of butadiene and vinyl chloride was carried out under the same conditions as in Example 21 except that the catalyst used was a 0.5 ml solution of gallium trichloride in n-hexane (1.0 mol/l concentration), to obtain a fine white powder in the amount of 0.5 gr. (8.3 weight percent yield). The chlorine content was found to be 20.96 weight according to the method as in Example 21. The vinyl chloride content in the copolymer was 34 mol percent.

EXAMPLE 26

Into the same test tube as in Example 14 were charged under the same conditions 50 m mol (3.8 ml) liquified butadiene, 50 m mol (2.8 ml) liquified vinyl chloride, 10 ml methylene chloride as solvent and 2.5 ml solution of tungsten hexachloride in n-hexane (0.2 mol/l concentration) as catalyst. The tube was sealed and arranged for rotation in a constant temperature bath of 20°C for a 20 hour polymerization. Using the same isolation procedure as in Example 14, a fine white powder was obtained in the amount of 1.59 gr. (27.3 weight percent yield). The Schöniger-flask burning method showed the chlorine content as 4.10 weight percent. The vinyl chloride content in the copolymer was 6 mol.

EXAMPLE 27

The copolymerization of butadiene and vinyl chloride was carried out according to the same method as in Example 1 but using titanium tetrachloride and ethylaluminum dichloride in combination as catalyst. A pressure-proof glass test tube of about 100 ml capacity flushed with dried nitrogen gas was charged with 60 m mol (4.6 ml) liquified butadiene, 140 m mol (8.0 ml) liquified vinyl chloride and 50 ml methylene chloride in this order in vacuo and at a temperature of −78°C. After shaking to mix the contents sufficiently, 0.4 ml of a solution of titanium tetrachloride in n-hexane (1.0 mol/l concentration) and 1.0 ml of a solution of ethylaluminum dichloride in n-hexane (1.0 mol/l concentration) were added so that the molar ratio of Ti to Al was 1 to 5. After sufficient shaking, the tube was sealed and placed in a dry ice-methanol bath at −78°C to stand undisturbed while polymerization proceeded for 10 hours. The reaction system was homogeneous from the beginning to the end and remained transparent and light yellow. Using the same isolataion procedure as in Example 1, a white powdery copolymer was obtained in the amount of 1.28 gr. (10.67 weight percent yield), of whose chlorine content was 23.30 weight percent according to the Schöniger-flask burning method. The vinyl chloride content in the copolymer was 37.62 mol percent. The infrared absorption spectrum and nuclear magnetic resonance absorption spectrum of the resulting copolymer were both substantially the same as in the case where a single catalyst system was used.

EXAMPLES 28 – 30

The copolymerization of butadiene and vinyl chloride was carried out as in Example 27 but charging 30 m mol (2.3 ml) butadiene and 70 m mol (4.0 ml) vinyl chloride and adding methylene chloride as a solvent in the amount of 20 ml. As catalyst, combinations of n-hexane solutions of vanadium tetrachloride (1.0 mol/l concentration), of gallium trichloride (1.0 mol/l concentration) and of vanadyl trichloride (1.0 mol/l concentration) respectively with a n-hexane solution of ethylaluminum dichloride (0.5 mol/l concentration) were used in such amount that the ethylaluminum dichloride was 0.1 mol percent relative to the total monomers as charged and every metal halide compound was present in 5 times the molar amount of the ethylaluminum dichloride. The reactions were each carried out in a dry ice-methanol bath at −78°C for 20 hours with no agitation, the results being given in Table 7.

Table 7

| Example | Catalyst | | Copolymer Yield (weight %) | Vin.Chl. Content (mol %) * | Appearance |
|---|---|---|---|---|---|
| 28 | Vanadium Tetrachloride | Ethylaluminum Dichloride | 10.83 | 38.35 | White fine powder |
| 29 | Callium Trichloride | do. | 13.33 | 43.39 | do. |
| 30 | Vanadyl Trichloride | do. | 5.66 | 20.66 | do. |

EXAMPLE 31

The copolymerization of butadiene and vinyl chloride was carried out as in Example 1 but using n-butylaluminum dichloride as catalyst. A pressure-proof glass test tube of about 80 ml capacity was charged with 140 m mol (8.0 ml) liquified vinyl chloride, 60 m mol (4.6 ml) liquified butadiene and 40 ml methylene chloride, sufficiently shaken in a bath of −78°C, followed by adding 1.0 ml n-hexane solution of n-butylaluminum dichloride (1 mol/l concentration) through an hypodermic syringe. After further shaking, the tube was by fusion and sealed to be kept undisturbed at −78°C for a 24 hour polymerization. Using to the same isolation procedure as in Example 1, a fine white powdery copolymer was obtained in the amount of 2.18 gr. (18.2 weight percent yield). The chlorine content was 22.25 weight percent as a result of the Schöniger-flask burning method, from which the vinyl chloride content in the copolymer was calculated as 36 mol percent. It was confirmed that the structure of the resulting copolymer was just the same as that of Example 1 according to determinations of the infrared and nuclear magnetic resonance absorption spectra.

We claim:

1. A process for manufacturing a random copolymer of a conjugated diolefin and vinyl chloride, having a vinyl chloride content of 5 to 50 mol percent which comprises carrying out the copolymerization in the presence of a halogenated hydrocarbon as solvent, at a temperature of −100° to 80°C, the molar ratio of said conjugated diolefin to vinyl chloride being 98/2 to 2/98, using an unmodified catalyst, in the presence of at least the vinyl chloride monomer, said catalyst being selected from the group consisting of acidic Friedel-Crafts metal halide compounds wherein the metal is of Groups II to VIII of the Periodic Table and alkylaluminum halide compounds of the formula, Al $R_n$ $X_{3-n}$ wherein R represents an alkyl group, X represents a halogen atom and $n$ represents 1 or 1.5 so that the molar ratio of said catalyst to the total amount of the monomers as charged is 0.05 to 0.0001.

2. A process as claimed in claim 1, wherein said catalyst consists of at least one acidic Friedel-Crafts metal halide selected from the group consisting of halides of beryllium, boron, aluminum, gallium, titanium, tin, vanadium, tungsten and iron.

3. A process as claimed in claim 2, wherein said halide is aluminum trichloride, aluminum tribromide, boron trifluoride etherate, gallium trichloride, titanium tetrachloride, stannic chloride, ferric chloride, vanadium tetrachloride, vanadyl trichloride or tungsten hexachloride.

4. A process as claimed in claim 1, wherein said alkylaluminum halide is represented by the general formula, Al $R_n$ $Cl_{3-n}$ wherein R is an alkyl group having 1 to 4 carbon atoms and $n$ represents 1 or 1.5.

5. A process as claimed in claim 4 wherein said alkylaluminum chloride is selected from the group consisting of ethylaluminum dichloride, ethylaluminum sesquichloride and n-butylaluminum dichloride.

6. A process as claimed in claim 1 wherein said catalyst is a combination selected from the group consisting of vanadium tetrachloride/ethylaluminum dichloride, titanium tetrachloride/ethylaluminum dichloride, gallium trichloride/ethylaluminum dichloride and vanadyl trichloride/ethylaluminum dichloride.

7. A process as claimed in claim 1 wherein said conjugated diolefin has 4 to 10 carbon atoms.

8. A process as claimed in claim 7 wherein said conjugated diolefin is butadiene.

9. A process as claimed in claim 7 wherein said conjugated diolefin is isoprene.

10. A process as claimed in claim 1 wherein said halogenated hydrocarbon solvent is selected from the group consisting of chloroform and methylene chloride.

11. A process as claimed in claim 1 wherein the molar ratio of said catalyst to the total amount of monomers charged ranges from 0.005 to 0.0002.

* * * * *